(12) United States Patent
Sakai

(10) Patent No.: US 8,582,003 B2
(45) Date of Patent: Nov. 12, 2013

(54) SOLID-STATE IMAGING APPARATUS

(75) Inventor: Seiichirou Sakai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 13/106,946

(22) Filed: May 13, 2011

(65) Prior Publication Data

US 2011/0285893 A1 Nov. 24, 2011

(30) Foreign Application Priority Data

May 21, 2010 (JP) .................................. 2010-117723

(51) Int. Cl.
H04N 5/217 (2011.01)
H04N 3/14 (2006.01)

(52) U.S. Cl.
USPC ............ 348/241; 348/300; 348/308; 348/312

(58) Field of Classification Search
USPC ......... 348/241, 243, 248, 294, 300, 301, 308, 348/312; 257/292; 250/208.1
See application file for complete search history.

(56) References Cited

U.S. PATENT DOCUMENTS

| | | | |
|---|---|---|---|
| 4,663,669 A | 5/1987 | Kinoshita et al. | |
| 4,774,585 A | 9/1988 | Suga et al. | |
| 4,780,764 A | 10/1988 | Kinoshita et al. | |
| 4,821,105 A | 4/1989 | Suga et al. | |
| 5,471,515 A * | 11/1995 | Fossum et al. | 257/292 |
| 6,128,039 A * | 10/2000 | Chen et al. | 348/301 |
| 7,068,312 B2 * | 6/2006 | Kakumoto et al. | 348/241 |
| 7,227,208 B2 | 6/2007 | Ogura et al. | |
| 7,378,640 B2 * | 5/2008 | Machida | 348/E5.079 |
| 7,456,880 B2 | 11/2008 | Okita et al. | |
| 7,456,887 B2 * | 11/2008 | Zhao et al. | 348/241 |
| 7,514,732 B2 | 4/2009 | Okita et al. | |
| 7,525,585 B2 | 4/2009 | Murakami et al. | 348/294 |
| 7,605,415 B2 | 10/2009 | Koizumi et al. | |
| 7,629,568 B2 | 12/2009 | Koizumi et al. | 250/214 R |
| 7,638,826 B2 | 12/2009 | Hiyama et al. | |
| 7,692,702 B2 * | 4/2010 | Sano | 348/300 |

(Continued)

FOREIGN PATENT DOCUMENTS

| CN | 1764246 A | 4/2006 |
|---|---|---|
| CN | 101309345 A | 11/2008 |

(Continued)

OTHER PUBLICATIONS

Comm. from the Chinese Patent Office dated Mar. 7, 2013, in counterpart Chinese Appl'n. No. 2011-10131305.2.

Primary Examiner — Nhan T Tran
(74) Attorney, Agent, or Firm — Fitzpatrick, Cella, Harper & Scinto

(57) ABSTRACT

Provided is a solid-state imaging apparatus comprising signal lines to each of which a signal is outputted from each of pixels, a first holding capacitor for holding the signal outputted from each of the signal lines, first CMOS switches arranged between the signal lines and the first holding lines, each of the first CMOS switches including a first NMOS transistor and a first PMOS transistor, a first control line commonly connected to the gates of the first NMOS transistors of the first CMOS switches, and a second control line commonly connected to the gates of the first PMOS transistors of the first CMOS switches, and signals of different timings are supplied to the first control line and the second control line such that a timing of turning off the first NMOS transistor is shifted from a timing of turning off the first PMOS transistor.

11 Claims, 10 Drawing Sheets

(56) References Cited

U.S. PATENT DOCUMENTS

| | | |
|---|---|---|
| 7,759,706 B2 | 7/2010 | Itonaga et al. ............... 257/227 |
| 7,812,873 B2 | 10/2010 | Hiyama et al. |
| 7,812,876 B2 * | 10/2010 | Hiyama et al. ............... 348/300 |
| 7,906,755 B2 | 3/2011 | Koizumi et al. |
| 7,943,975 B2 | 5/2011 | Koizumi et al. |
| 7,948,546 B2 | 5/2011 | Tsukimura ................. 348/308 |
| 8,053,718 B2 | 11/2011 | Koizumi et al. ......... 250/214 R |
| 8,072,522 B2 | 12/2011 | Taura ........................ 348/300 |
| 2006/0081957 A1 | 4/2006 | Itonaga et al. ............... 257/444 |
| 2006/0158540 A1 | 7/2006 | Murakami et al. ........... 348/308 |
| 2007/0001098 A1 | 1/2007 | Sano ....................... 250/208.1 |
| 2008/0088726 A1 | 4/2008 | Tsukimura ................. 348/308 |
| 2008/0284885 A1 | 11/2008 | Taura ........................ 348/300 |
| 2009/0101798 A1 * | 4/2009 | Yadid-Pecht et al. ...... 250/208.1 |
| 2009/0159783 A1 | 6/2009 | Koizumi et al. ........... 250/208.1 |
| 2009/0159945 A1 | 6/2009 | Okita et al. |
| 2009/0218479 A1 | 9/2009 | Arishima et al. |
| 2010/0060763 A1 | 3/2010 | Hiyama et al. |
| 2010/0134669 A1 * | 6/2010 | Kinugasa ..................... 348/294 |
| 2010/0264298 A1 | 10/2010 | Ryoki et al. |
| 2010/0328510 A1 | 12/2010 | Hiyama et al. |
| 2011/0114822 A1 | 5/2011 | Koizumi et al. ........... 250/208.1 |
| 2011/0175150 A1 | 7/2011 | Koizumi et al. |

FOREIGN PATENT DOCUMENTS

| | | |
|---|---|---|
| CN | 101465946 | 6/2009 |
| JP | 2001-230974 A | 8/2001 |
| JP | 2004-312472 A | 11/2004 |
| JP | 2007-013756 A | 1/2007 |
| JP | 2008-099066 A | 4/2008 |
| JP | 2008-263298 A | 10/2008 |
| JP | 2008-278460 A | 11/2008 |

\* cited by examiner

SOLID-STATE IMAGING APPARATUS

BACKGROUND OF THE INVENTION

1. Field of the Invention

The present invention relates to solid-state imaging apparatus.

2. Description of the Related Art

As MOS-type solid-state imaging apparatus, a configuration having pixels arranged in a two-dimensional array, each column of which is provided with a signal holding capacitor and switch unit of the signal holding capacitor, is disclosed (Japanese Patent Application Laid-Open No. 2001-230974). Also, a configuration having an operational amplifier, a signal holding capacitor, and switch unit of the signal holding capacitor provided for each column as a unit of restraining amplification of a random noise by amplifying a signal in order to improve the signal-to-noise ratio of the solid-state imaging apparatus is disclosed (Japanese Patent Application Laid-Open No. 2008-278460). Further, Japanese Patent Application Laid-Open No. 2008-263298 discloses the use of a CMOS switch as the switch of signal holding capacitors. By using a CMOS switch as the switch of the signal holding capacitors, the configuration can load a higher voltage to the signal holding capacitors than the configuration using only the NMOS transistor as the switch does, thereby can increase the dynamic range in the signal holding capacitors.

The inventors found an issue that when an intensive spotlight is incident on a pixel area in the configuration, which uses CMOS switches as the switches of the signal holding capacitors, a white or black stripe results on either side of the spot. It is found that this problem is caused by the fact that not all the NMOS transistors and the PMOS transistors, which compose the CMOS switches in the whole area of the imaging plane, transit from the conducting state to the non-conducting state at the same timing.

It is generally known that a change in the electric potential of the gate during the turning on/off of the NMOS transistors and the PMOS transistors leads electric potential fluctuation at the drain side via the MOS transistor parasitic. If the NMOS transistor and the PMOS transistor are turned off almost at the same time, the electric potential fluctuation is canceled in the CMOS switch. If one CMOS switch is turned off earlier than the other CMOS switch, however, the signal electric potential loaded in the drain or source of the transistor fluctuates when the later CMOS switch is turned off. If this fluctuation equally occurs in the whole imaging area, neither a white stripe nor a black stripe occurs. It is found that if the NMOS transistors and the PMOS transistors are turned off almost at the same time in one area but not turned off at the same timing in the other area in the entire imaging area, the electric potential of the loaded signal differs between the two areas, which causes such a phenomenon as a white stripe and a black stripe.

When many of the pixels output signals which are biased to specific electric potential like an intensive spotlight, either the NMOS transistors or the PMOS transistors are turned on. Since the MOS transistor has the bigger gate parasitic in the off state than in the on state, there will be a significant difference in the parasitic between the control line which has many on-state MOS transistors connected thereto and the control line which has many off-state MOS transistors connected thereto. That causes a delay in pulses transmitting through the control lines, thereby causes a difference in the on/off timing between the NMOS transistors and the PMOS transistors. In that manner, an intensive spotlight causes a white stripe and a black stripe in an image.

SUMMARY OF THE INVENTION

An object of the present invention is to provide solid-state imaging apparatus that can prevent the picture quality from being degraded by a white stripe or a black stripe caused by an intensive spotlight.

The present invention provides an present invention provides an solid-state imaging apparatus comprising: a plurality of signal lines to each of which a signal is outputted from each of a plurality of pixels; a plurality of first holding capacitors for holding the signal outputted from each of the plurality of signal lines; a plurality of first CMOS switches arranged between the plurality of signal lines and the plurality of first holding capacitors, each of the plurality of first CMOS switches including a first NMOS transistor and a first PMOS transistor; a first control line electrically connected to a gate of a plurality of the first NMOS transistors; and a second control line electrically connected to a gate of a plurality of the first PMOS transistors, wherein the first and second control lines supply signals of different timings, such that a timing of turning off the first NMOS transistor is shifted from a timing of turning off the first PMOS transistor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
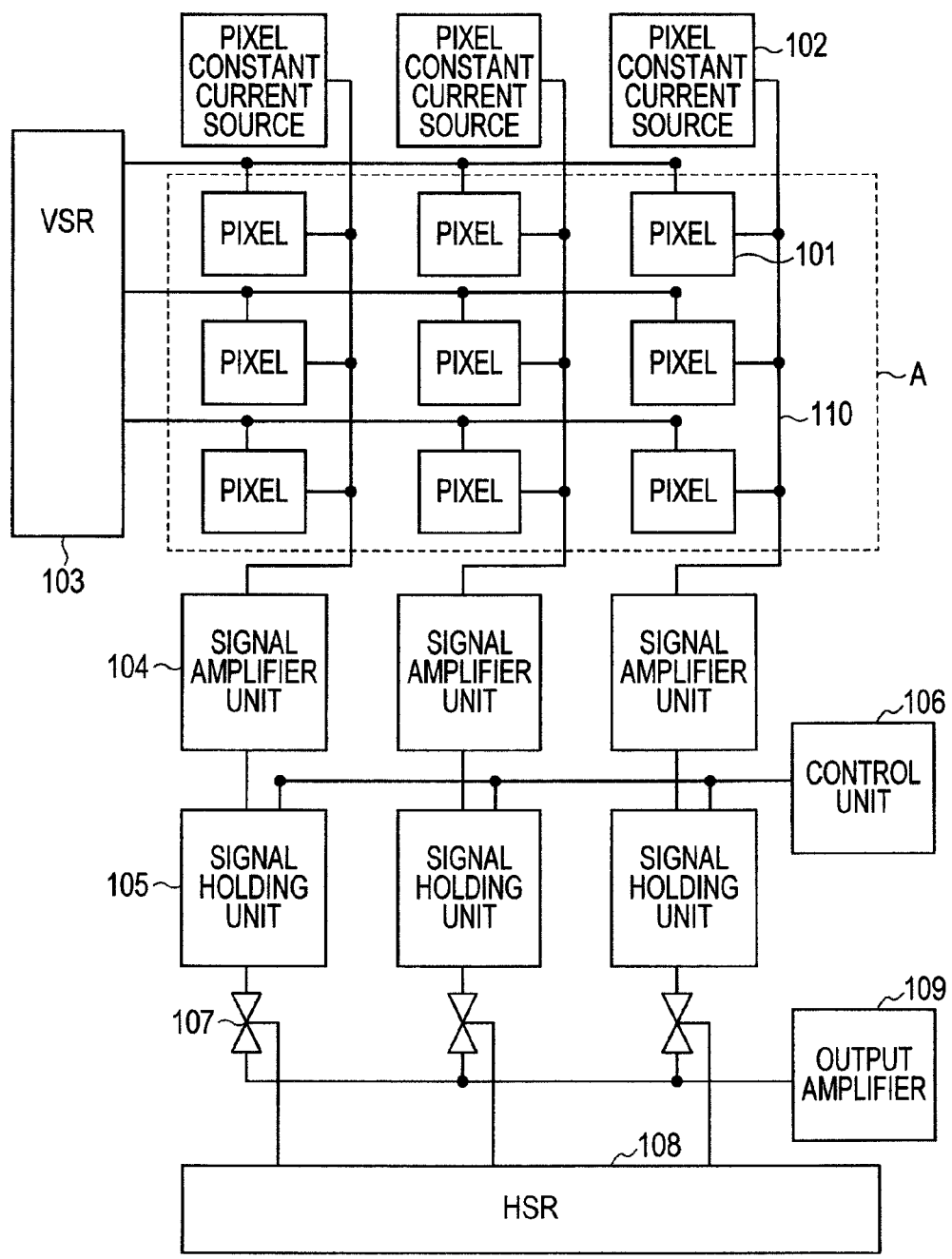
FIG. 1 is a block diagram illustrating a configuration example of solid-state imaging apparatus of a first embodiment according to the present invention.

FIG. 1 is a block diagram illustrating a configuration example of solid-state imaging apparatus of a first embodiment according to the present invention. The solid-state imaging apparatus includes a pixel array A, a pixel constant current source 102, a vertical scan circuit 103, a signal amplifier unit 104, a signal holding unit 105, a signal write control unit 106 from the signal amplifier unit 104 to the signal holding unit 105, a switch 107, a horizontal scan circuit 108 and an output amplifier 109. The pixel array A has pixels 101. In this figure, the pixels 101 are arranged in matrix, forming rows and columns. Although the pixel array A consists of three rows by three columns of the pixels 101 in FIG. 1, that is merely for simplicity of the description and not intended to limit the configuration of the pixel array A thereto. The pixel 101 has a photoelectric conversion portion that generates an electric signal by photoelectric conversion. Signals are outputted from the pixels 101 to column signal lines 110. The signal amplifier unit 104 is provided for the electric path between the column signal lines 110 and signal holding units 105 for amplifying signals from the column signal lines 110. The signal holding unit 105 holds the signal read by the signal amplifier unit 104. The output amplifier 109 is adapted to read out the signals held in the signal holding unit 105 via the switch 107. The signal amplifier unit 104 and the signal holding unit 105 may be provided for one or more columns. The vertical scan circuit 103 typically includes a shift register and selects a row from the pixel array A. The horizontal scan circuit 108 typically includes the shift register and selects a column from the pixel array A. In this example, a column is selected from the pixel array A by selectively activating the switch 107 so that the signal is transferred from the signal holding unit 105 to the output amplifier 109.

Figure 2:
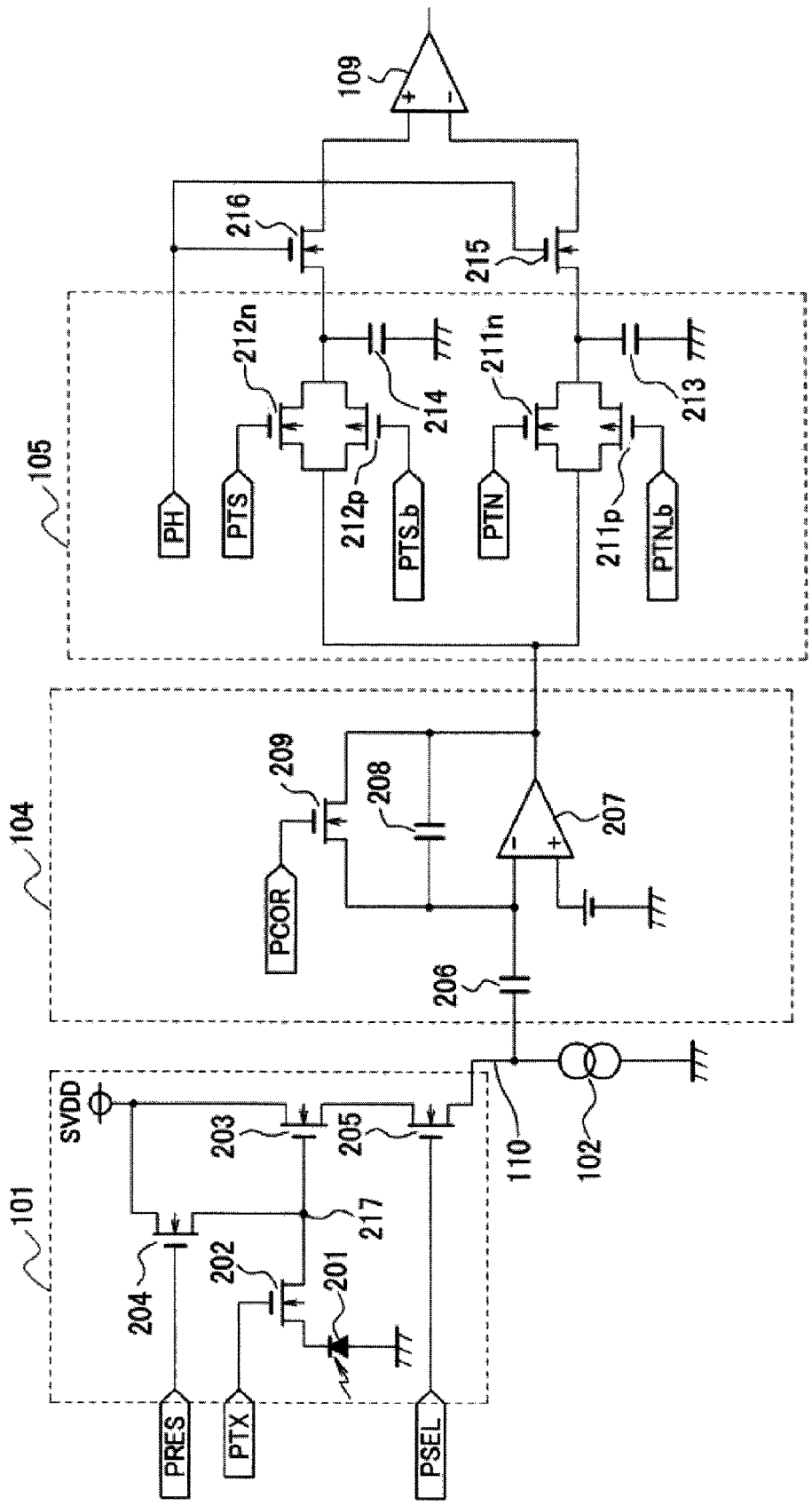
FIG. 2 is a diagram illustrating a detailed configuration example of the solid-state imaging apparatus illustrated in FIG. 1.

FIG. 2 is a diagram illustrating a detailed configuration example of the pixel 101, the signal amplifier unit 104 and the signal holding unit 105. The pixel 101 includes a photodiode (photoelectric conversion portion) 201, a transfer transistor 202, an amplifier transistor (source follower transistor) 203, a reset transistor 204 and a select transistor 205, for example. The photodiode 201 generates an electric signal by photoelectric conversion. The electric charge generated by photoelectric conversion in the photodiode 201 is transferred by the transfer transistor 202 to a floating diffusion (hereinafter referred to as FD) 217. This electric charge decides the electric potential of the FD 217. The FD 217 is a node common to a gate of the amplifier transistor 203. The signal based on the electric charge transferred to the FD 217 is amplified by the amplifier transistor 203 and outputted to the column signal line 110 via the select transistor 205. The column signal lines 110 are connected to the pixel constant current sources 102 to form a source follower circuit. The signal amplifier unit 104 includes a clamp capacity 206, an inversion amplifier 207, a feedback capacity 208 and a clamp switch 209, for example. The column signal line 110 is electrically connected to one end of the clamp capacity 206 in the signal amplifier unit 104. In this figure, they are connected directly to each other, but may be connected via a switch. The feedback capacity 208 and the clamp switch 209 are serially connected between the input end and the output end of the inversion amplifier 207. The output end of the signal amplifier unit 104 is electrically connected to the signal holding unit 105. The signal holding unit 105 includes switches 211n, 211p, 212n, 212p, holding capacitors 213 and 214, for example. Preferably, the holding capacitors 213 and 214 have the same capacity. The output end of the signal amplifier unit 104 is connected to the holding capacitors 213 and 214 via the switches 211n, 211p, 212n and 212p, respectively. The control unit 106 controls the switches 211n, 211p, 212n and 212p. The signals held in the holding capacitors 213 and 214 are transferred to the output amplifier 109 when a column select switches 215 and 216 are turned on according to a PH pulse supplied from the horizontal scan circuit 108. The holding capacitors 213 and 214 hold an N (noise) output and an S (optical signal) output, respectively, and the output amplifier 109 amplifies the difference between the N output and the S output.

The first holding capacitors 214 in respective columns hold the signals outputted from the column signal lines 110 in respective columns. A first CMOS switch including the first NMOS transistor 212n and the first PMOS transistor 212p is provided in the electric path between the column signal line 110 and the first holding capacitor 214. The NMOS transistor is an N channel MOS field-effect transistor and the PMOS transistor is a P channel MOS field-effect transistor. A first control line to which a pulse PTS is supplied is electrically connected to the gate of the first NMOS transistor 212n of each of the first CMOS switches in the columns. A second control line to which a pulse PTS_b is supplied is electrically connected to the gate of the first PMOS transistor 212p of each of the first CMOS switches in the columns.

Second holding capacitors 213 in respective columns hold singles outputted from the column signal lines 110 in respective columns while the pixels 101 remain reset. A second CMOS switch including the second NMOS transistor 211n and the second PMOS transistor 211p is provided in the electric path between the signal line 110 and the second holding capacitor 213. A third control line to which a pulse PTN is supplied is electrically connected to the gate of the second NMOS transistor 211n of each of the second CMOS switches in respective columns. A fourth control line to which a pulse PTN_b is supplied is electrically connected to the gate of the second PMOS transistor 211p of each of the second CMOS switch in respective columns.

Figure 3:
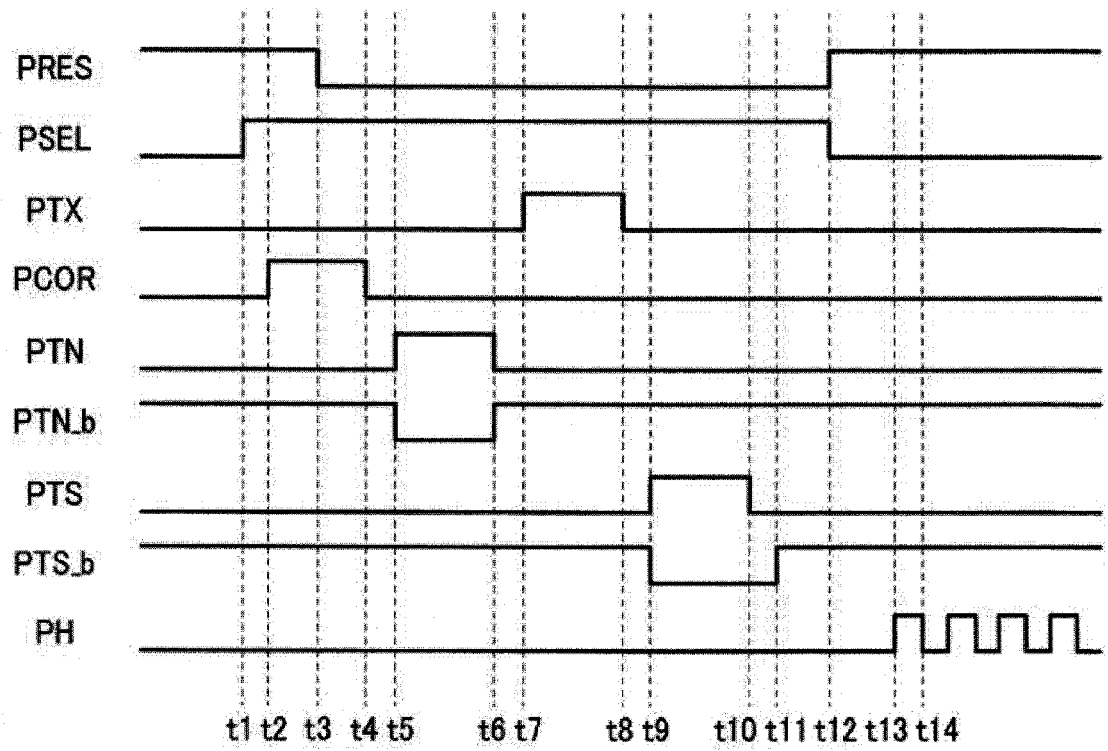
FIG. 3 is a timing diagram illustrating an operation example of the solid-state imaging apparatus of the first embodiment.

FIG. 3 is a timing diagram illustrating an operation example of the solid-state imaging apparatus illustrated in FIG. 1 and FIG. 2. The operation of the solid-state imaging apparatus will be described with reference to FIG. 3. Hereinafter, it is assumed that each transistor is activated by a high level pulse. At time t1, a select signal PSEL that is supplied to the gate of the select transistor 205 rises to the high level. That turns on the select transistor 205, and activates the amplifier transistor 203. In this state, a reset signal PRES is at the high level, the reset transistor 204 is turned on, and the FD 217 is reset by a reset electric potential SVDD. At time t2, a clamp pulse PC0R rises to the high level, which turns on the clamp switch 209, and the inversion amplifier 207 functions as a unity gain buffer and outputs the electric potential of VC0R. At time t3, a reset signal PRES, which is supplied to the gate of the reset transistor 204, drops to the low level, which turns off the reset transistor 204, makes the electric potential of the FD 217 floating, and a reference electric potential VN of the column signal line 110 is decided. At time t4, the clamp pulse PC0R drops to the low level, which turns off the clamp switch 209, and a reference electric potential VN of the column signal line 110 is clamped. At time t5, the PTN pulse rises to the high level and the PTN_b pulse drops to the low level, which turn on the switches 211n and 211p of the signal holding unit 105, and writing of the value of the VC0R voltage superimposed with the offset voltage of the inversion amplifier 207 into the holding capacitor 213 starts. At time t6, the PTN pulse drops to the low level and the PTN_b rises to the high level, which turn off the switches 211n and 211p, and the writing finishes. At time t7, a transfer pulse PTX that is supplied to the gate of the transfer transistor 202 of the pixel 101 rises to the high level, which turns on the transfer transistor 202, and the signal electric charge from the photodiode 201 is transferred to the FD 217. At time t8, the transfer pulse PTX drops to the low level, which turns off the transfer transistor 202, and here, the transfer has completed. Then at time t9, the PTS pulse rises to the high level and the PTN_b pulse drops to the low level, which turn on the switches 212n and 212p of the signal holding unit 105, and the signal is written in the holding capacitor 214.

In response to the rising of the transfer pulse PTX to the high level, the electric potential of the column signal line 110 changes from VN to VS. When the signal electric charge is an electron, VS≤VN. The amplified signal is written in the holding capacitor 214 via the switches 212n and 212p of the signal holding unit 105. At time t10, the PTS pulse is dropped to the low level and the switch 212n is turned off, then at the time t11, the PTS_b pulse is raised to the high level and the switch 212p is turned off, and the writing finishes. That is, the pulse PTS and the pulse PTS_b are supplied at the different timings so that the switch 212n and the switch 212p are turned off at different timings. Specifically, the control unit 106 controls the pulses PTS, PTS_b, PTN and PTS_b.

Then at the time t12, the reset signal PRES rises to the high level, which turns on the reset transistor 204 in the pixel 101, and the FD 217 is reset. At the same moment, the select signal PSEL drops to the low level, which turns off the select transistor 205. Accordingly, the row selection is deselected. Then at time t13, the PH pulse supplied from the horizontal scan circuit 108 turns on the column select switches 215 and 216, and the output amplifier 109 calculates the difference between the N output and the S output and outputs the image signal. That process ends at time t14, and thereafter, signals are outputted from the columns in order in synchronization with the PH pulse.

Now, the advantages of the embodiment will be clarified. The mechanism of occurrence of a white or black stripe on either side of an intensive spotlight which is incident on the configuration using a CMOS switch as the switches 212n and 212p of the signal holding capacitor 214 will be described. This problem is caused by a phenomenon that the output electric potential of the signal amplifier unit 104 changes the gate capacities of the NMOS transistor 212n and PMOS transistor 212p constituting the CMOS switch.

Figure 4A:
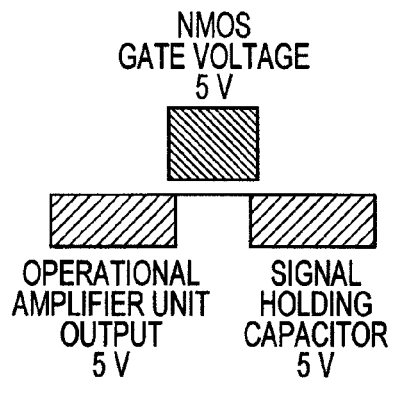
FIGS. 4A and 4B are diagrams illustrating operating points of NMOS transistors in signal holding capacitors.
Figure 4B:
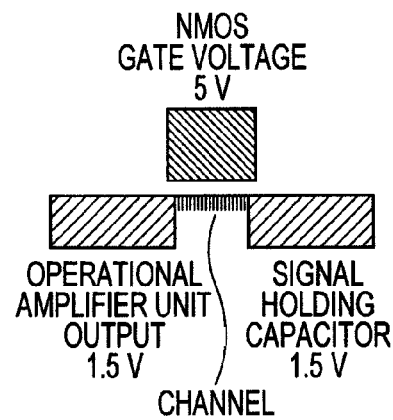

FIG. 4A illustrates a schematic diagram of the NMOS transistor 212n constituting the CMOS switch. It has the source connected to the signal holding capacitor 214 and the drain connected to the output of the signal amplifier unit 104. When the output of the signal amplifier unit 104 and the gate electric potentials of the signal holding capacitor 214 and the NMOS transistor 212n become the VDD (power source electric potential), a channel is not generated in the NMOS transistor 212n so that a channel capacity is not generated, which decreases the gate capacity of the NMOS transistor 212n. In contrast, when the output of the signal amplifier unit 104 and the electric potential of the signal holding capacitor 214 are 1.5 V, for example, and the gate electric potential of the NMOS transistor 212n is 5V as shown in FIG. 4B, a channel is generated. Then, the channel capacity is generated and the gate capacity increases. The PMOS transistor 212p exhibits the feature opposite to that of the NMOS transistor 212n. When an intensive spotlight is incident on part of an imaging plane, the output electric potential of the signal amplifier unit 104 corresponding to the pixels 101 on which the spotlight is incident rises to the VDD. That decreases the gate capacity of the NMOS transistor 212n of the CMOS switch of the signal holding capacitor 214, and increases the gate capacity of the PMOS transistor 212p.

Figure 5:
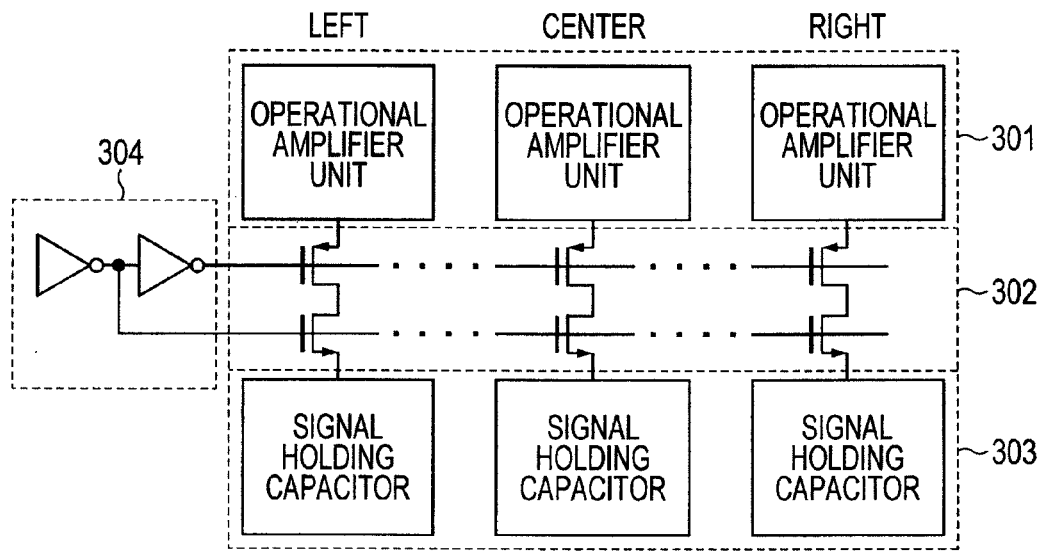
FIG. 5 is a diagram of operational amplifiers, CMOS switches, and signal holding capacitors disposed in rows.

FIG. 5 illustrates a schematic diagram of operational amplifiers 301, CMOS switches 302, and signal holding capacitors 303 disposed in rows. The operational amplifier 301 corresponds to the signal amplifier unit 104. They are disposed in thousands of columns in fact, and not limited to the three columns. The operational amplifier 301 is connected to the signal holding capacitor 303 via the CMOS switch 302. Also disposed is a buffer 304 for driving the gates of the NMOS transistor and the PMOS transistor of the CMOS switch 302. When a spotlight is incident on the center of the screen whereby the outputs of the central operational amplifiers 301 are saturated, the gate capacity decreases since no channel is generated under the gate of the NMOS transistors constituting the CMOS switch 302. Since the capacity of the buffer 304 for driving the NMOS transistors decreases accordingly, the transistors are turned off faster than they are during the dark period at the farther side from the buffer 304. Since the turn-off speed depends on the driving force of the buffer 304 at the nearer side from the buffer 304, the channel capacity does not influence the turn-off speed so much. In contrast, since the drive capacity of the buffer 304 for driving the PMOS transistor increases, the turn-off speed becomes slower than it is during the dark period at the farther side from the buffer 304. Since the turn-off speed depends on the driving force of the buffer 304 at the nearer side from the buffer 304, the channel capacity does not influence the turn-off speed so much.

Due to the above-mentioned phenomenon, the NMOS transistor and the PMOS transistor of the CMOS switch 302 of the signal holding capacitor 303 near to the buffer 304 are turned off almost at the same time. In this case, which of the NMOS transistor and the PMOS transistor of the CMOS switch 302 of the signal holding capacitor 303 located farther from the buffer 304 is turned off first depends on the outputs from the operational amplifiers 301 that are arranged on the way to the transistors. The configuration in which the buffers 304 for the CMOS switches 302 are provided on the both sides of the layout of the signal holding capacitors 303 is possible, though, it is not practical since it is difficult to have the two buffers 304 on the both sides turned on/off at the same timing. The NMOS transistor is turned off in response to the gate electric potential having changed from the VDD (power source electric potential) to the GND (reference electric potential). In contrast, the PMOS transistor is turned off in response to the gate electric potential having changed from the GND to the VDD. The electric potential held in the signal holding capacitor 303 is fixed to the output electric potential of the operational amplifier 301 while the CMOS switch 302 is on. After one of the NMOS transistor and the PMOS transistor of the CMOS switch 302 is turned off, the electric potential held in the signal holding capacitor 303 is changed by the condenser coupling according to the gate electric potential change. Specifically, when the NMOS transistor is turned off after the PMOS transistor, the electric potential of the signal holding capacitor 303 is changed to the GND side, and when the PMOS transistor is turned off after the NMOS transistor, the electric potential of the signal holding capacitor 303 is changed to the VDD side.

As mentioned above, when an intensive spotlight is incident on part of the imaging plane in the configuration that uses a CMOS switch as the switch 302 of the signal holding capacitor 303, a white or black stripe occurs at the farther side from the buffer 304 that drives the gate of the CMOS switch 302. When the NMOS transistor is turned off after the PMOS transistor, a black stripe occurs because the electric potential of the signal holding capacitor 303 is changed to the GND side and the signal decreases. When the PMOS transistor is turned off after the NMOS transistor, a white stripe occurs because the electric potential of the signal holding capacitor 303 is changed to the VDD side and the signal increases. Although the phenomenon has been described in the case that uses a buffer here, the same phenomenon may occur also in the case that does not use a buffer.

When signal writing finishes from time t10 to time t11 in FIG. 3, the output of the inversion amplifier 207 is saturated; therefore, a channel is not generated in the NMOS transistor 212n to write the VDD electric potential into the holding capacitor 214 and the gate capacity decreases. In contrast, a channel is generated in the PMOS transistor 212p and the gate capacity increases. Since the driving capacity of the buffer 304 that drives the NMOS transistors 212n decreases, the NMOS transistor 212n is turned off faster at the farther side from the buffer 304. In contrast, the PMOS transistor 212p is turned off slower at the farther side from the buffer 304. From the reason mentioned above, a white or black stripe has occurred at the farther side from the buffer 304 that drives the gate of the CMOS switch 302 according to which of the switch 212n (NMOS transistor) and the switch 212p (PMOS transistor) is turned off first.

Figure 6:
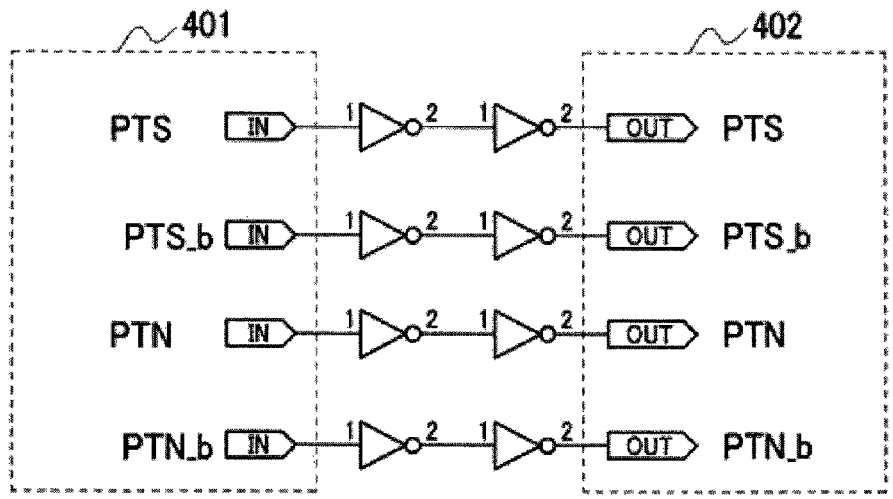
FIG. 6 is a diagram of a configuration example of a control unit in the solid-state imaging apparatus of the first embodiment.

Uncertainty about which of the NMOS transistor 212n and the PMOS transistor 212p is turned off first is the cause of the stripe occurrence. The embodiment uses the circuit shown in FIG. 6, for example, for the control unit 106 to stagger the timing pulses PTS, PTS_b, PTN, PTN_b for turning off the transistors. The embodiment ensures either of PTN and PTN_b and either of PTS and PTS_b turn off the transistors before the others. In FIG. 6, the reference numeral 401 denotes the pulse input unit from outside of the solid-state imaging apparatus as the first to the fourth electrode pads. The reference numeral 402 denotes the first to the fourth control lines of the signal holding unit 105. The pulse PTS is supplied to the gate of the NMOS transistor 212n via the first control line 402 that is electrically connected to the first electrode pad 401. The pulse PTS_b is supplied to the gate of the PMOS transistor 212p via the second control line 402 that is electrically connected to the second electrode pad 401. The pulse PTN is supplied to the gate of the NMOS transistor 211n via the third control line 402 that is electrically connected to the third electrode pad 401. The pulse PTN_b is supplied to the gate of the PMOS transistor 211p via the fourth control line 402 that is electrically connected to the fourth electrode pad 401. After PTS among PTS and PTS_b has completely turned off the transistor, the transistor is turned off by PTS_b. It is preferable that the first NMOS transistors 212n are turned off before the first PMOS transistors 212p or the first PMOS transistors 212p are turned off before the first NMOS transistors 212n in all the plurality of first CMOS switches in each column.

It is assumed that an intensive spotlight is incident on part of the pixel area in this state. A high electric potential signal is generated at the output of the inversion amplifier 207, the gate capacity for the NMOS transistors 212n in the same row increases, and the gate capacity for the PMOS transistors 212p in the same row decreases. Accordingly, the parasitic that is generated in the control line for supplying the pulse PTS increases and the parasitic that is generated in the control line for supplying the PTS_b decreases. The occurrence of a white or black stripe is suppressed because the external PTS and PTS_b are set with sufficient time difference so as not to change the timing for PTS and PTS_b to turn off the transistors across the imaging area even if the pulse PTS delays.

In general, the number of input and output pins of the solid-state imaging apparatus with the outside units are decreased as much as possible because of the restriction on the number of pins of packages. Usually, PTS and PTS_b are input from outside of the solid-state imaging apparatus, inverted by the inverter at the control unit 106 to generate the PTS_b pulse and the PTN_b pulse in the solid-state imaging apparatus. The embodiment is adapted to have the timing pulses for turning off the PTS, PTS_b, PTN and PTN_b transistors input from outside of the solid-state imaging apparatus so that the timing to turn off the transistors can be controlled at discretion.

Figure 7:
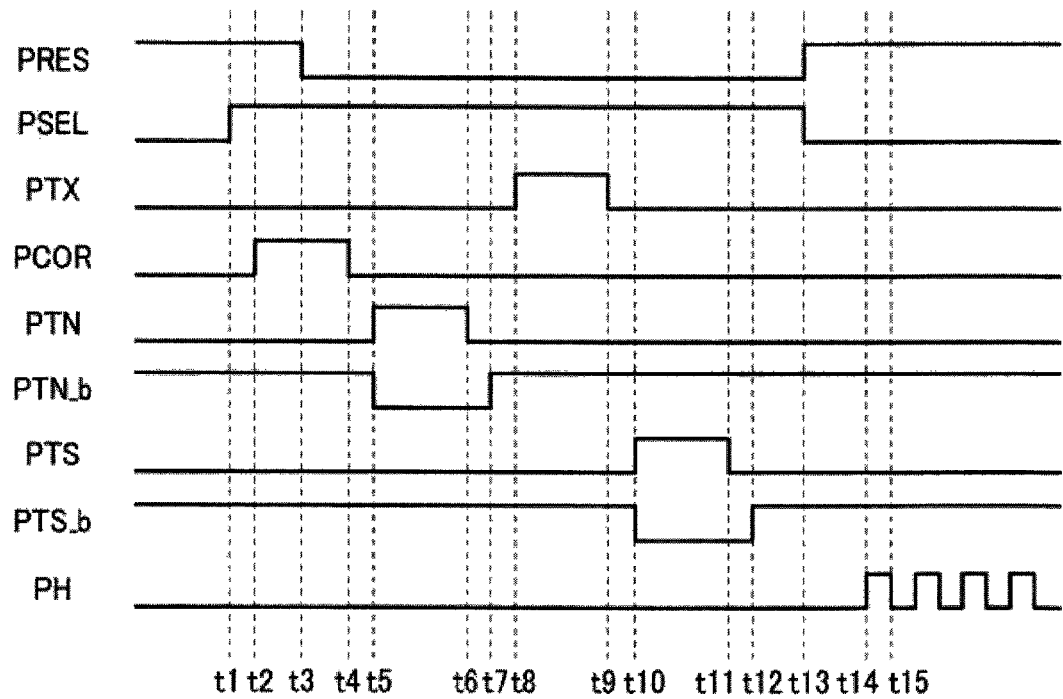
FIG. 7 is another timing diagram illustrating an operation example of the solid-state imaging apparatus of the first embodiment.

With the above-mentioned configuration, the embodiment turns off the NMOS transistor 212n by decreasing the pulse PTN to the low level at time t6 as shown in FIG. 7. The embodiment can also turn off the PMOS transistor 212p by increasing the pulse PTN_b to the high level at time t7, which is different from time t6. The embodiment staggers the timing to ensure that the pulse PTS turns off the NMOS transistor 212n before the pulse PTS_b turns off the PMOS transistor 212p. The embodiment also staggers the timing to ensure that the pulse PTN turns off the NMOS transistor 211n before the pulse PTN_b turns off the PMOS transistor 211p. This embodiment is more preferable in that it can more accurately obtain the difference between the S signal and the N signal. That is, in the embodiment, the pulse PTN and the pulse PTN_b are supplied at different timings so that the NMOS transistor 211n is turned off at a different timing from that the PMOS transistor 211p is turned off.

Second Embodiment

Figure 8:
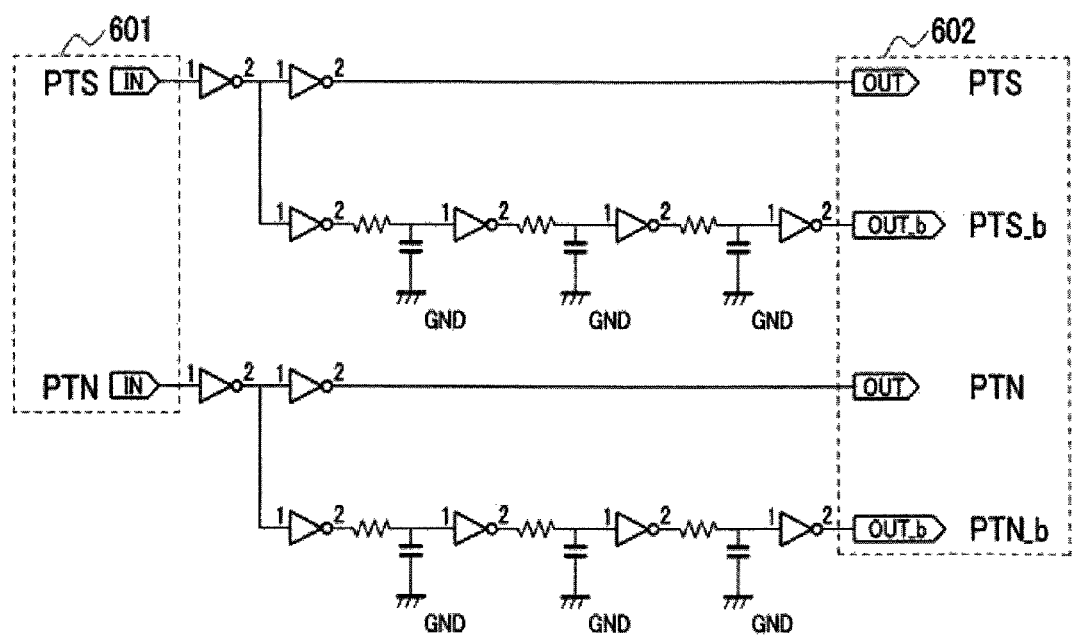
FIG. 8 is a diagram illustrating a configuration example of a control unit of the solid-state imaging apparatus of a second embodiment according to the present invention.

The block diagram illustrating a solid-state imaging apparatus of a second embodiment according to the present invention is the same as FIG. 1. The second embodiment is different from the first embodiment in the control unit 106. The other components are the same as those in the first embodiment. FIG. 8 is a diagram illustrating a detailed configuration example of the control unit 106 of the second embodiment. In FIG. 8, the reference numeral 601 denotes a pulse input unit from outside of the solid-state imaging apparatus, including an input pad, for example. In this example, a conductive pattern for forming an input pad for PTS and PTS_b and a conductive pattern for forming an input pad for PTN and PTN_b are provided. As another configuration, four conductive patterns independent of each other for forming four input pads, i.e., one input pad for each of PTS, PTS_b, PTN and PTN_b may be provided. The reference numeral 602 denotes a node that is electrically connected to each of the first to fourth control lines of the signal holding unit 105. The embodiment staggers the timing to ensure that PTS turns off the transistor before PTS_b by having the PTS and PTN timing pulses inputted from outside of the solid-state imaging apparatus and by using a delay circuit with a resistor and a capacity. Now, the delay quantity in the electric path to the transistor that is the nearest to the input pad among the transistors driven by PTS or PTS_b from the input pad will be discussed. The delay quantity occurred to the electric path for PTS is different from the delay quantity occurred to the electric path for PTS_b. Specifically, the delay quantity occurred to the electric path for PTS_b is larger than the delay quantity occurred to the electric path for PTS. This holds true for PTN. By adjusting the size of the resistor and capacity of the delay circuit, the timing for PTS to turn off the transistor can be always made before the timing for PTS_b to turn off the transistor across the imaging area. Then, the timing for PTN to turn off the transistor can be always made before the timing for PTN_b to turn off the transistor. With this design, the embodiment can suppress the occurrence of a white or black stripe at the both sides of an intensive spotlight. It is also effective to apply the circuit shown in FIG. 8 only to PTS and PTS_b like the first embodiment. The delay quantity may be changed by simply varying the wiring resistance without providing a delay circuit.

As mentioned above, the delay circuit delays the signal inputted into the electrode pad 601. One of the first control line 602 for transmitting the pulse PTS and the second control line 602 for transmitting the pulse PTS_b is connected to the electrode pad 601 of the pulse PTS via the delay circuit. That is, the delay quantities of the both pulses are made different from each other. The rest of the first control line 602 of the pulse PTS and the second control line 602 of the pulse PTS_b is connected to the electrode pad 601 without passing through the delay circuit. One of the third control line 602 of the pulse PTN and the fourth control line 602 of the pulse PTN_b is connected to the electrode pad 601 of the pulse PTN via the delay circuit. The rest of the third control line 602 of the pulse PTN and the fourth control line 602 of the pulse PTN_b is connected to the electrode pad 601 of the pulse PTN without passing through the delay circuit.

Third Embodiment

Figure 9:
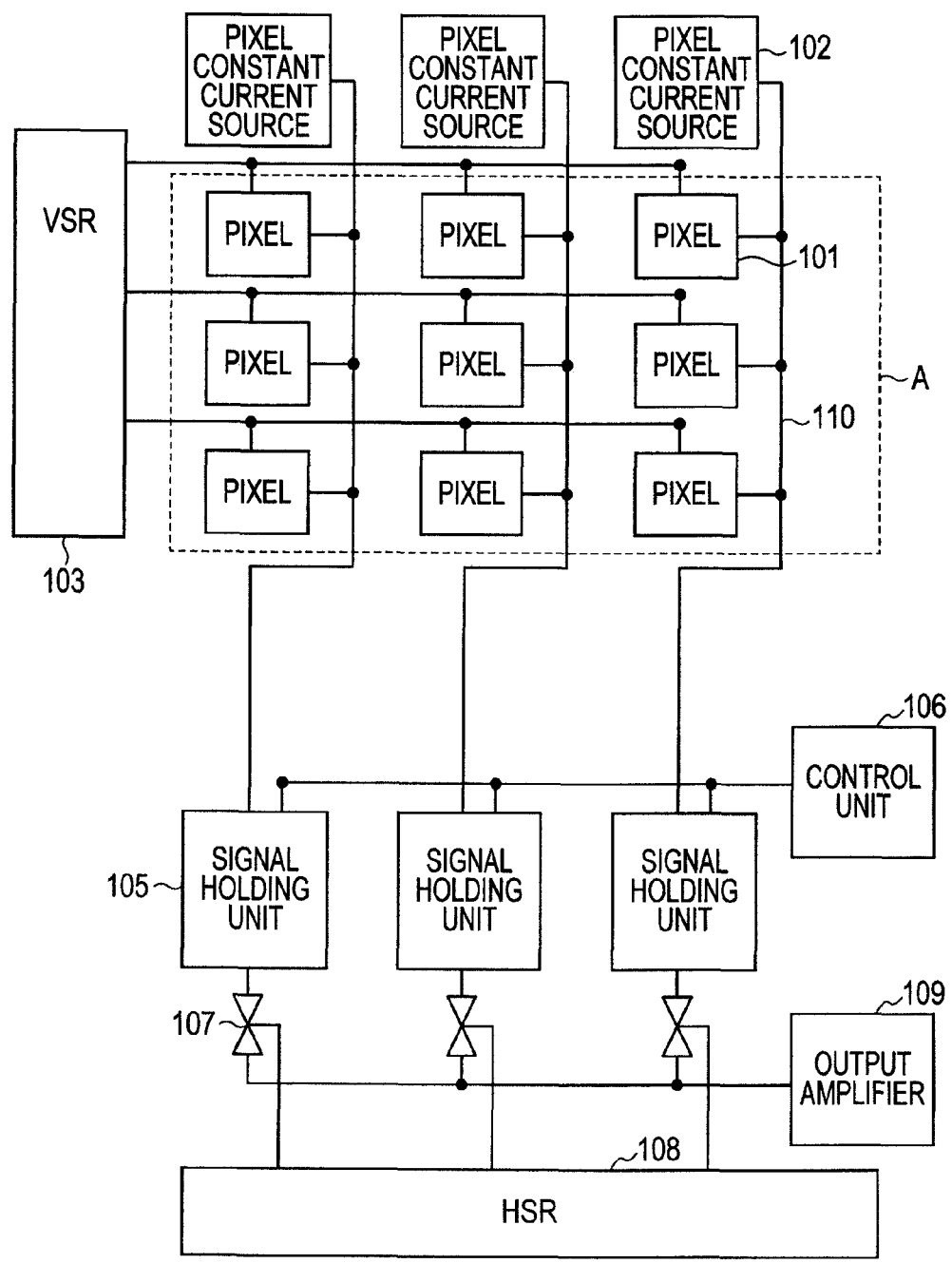
FIG. 9 is a block diagram illustrating a configuration example of the solid-state imaging apparatus of a third embodiment according to the present invention.

FIG. 9 is a block diagram illustrating a configuration example of a solid-state imaging apparatus of a third embodiment according to the present invention. The third embodiment is the same as the first embodiment except for omitting the signal amplifier unit 104.

Figure 10:
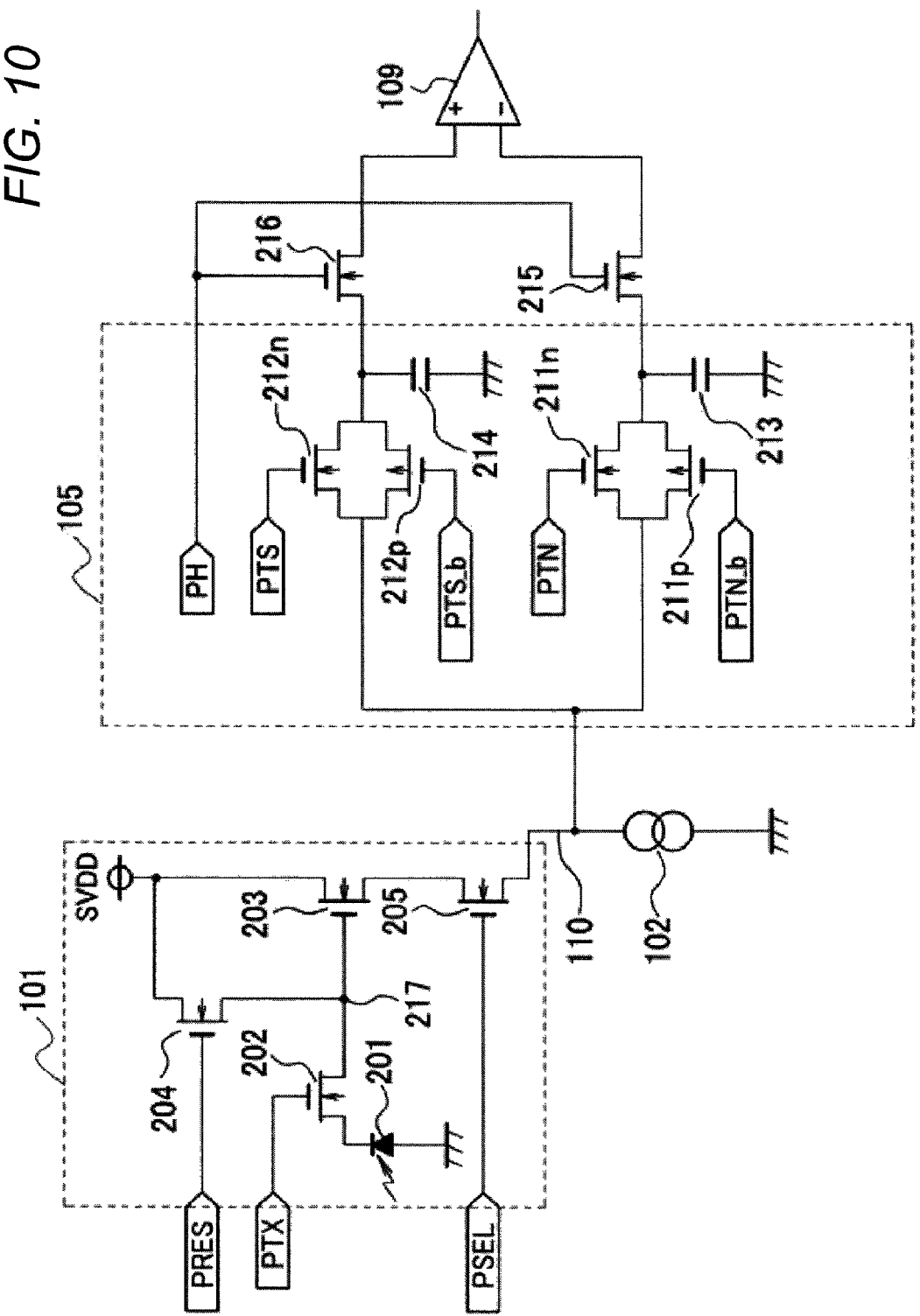
FIG. 10 is a diagram illustrating a detailed configuration example of the solid-state imaging apparatus illustrated in FIG. 9.

FIG. 10 is a diagram illustrating a detailed configuration example of a pixel 101 and a signal holding unit 105. The figure is the same as that of the first embodiment except for omitting the signal amplifier unit 104. Since the circuitry of the embodiment does not have an inversion amplifier in the signal processing circuit, the polarity of the signal written in the signal holding unit 105 is in inverse to that of the first embodiment. Therefore, in this embodiment, the quantities of the gate capacities of the NMOS transistor and the PMOS transistor by the spotlight are in inverse to those of the first embodiment.

Figure 11:
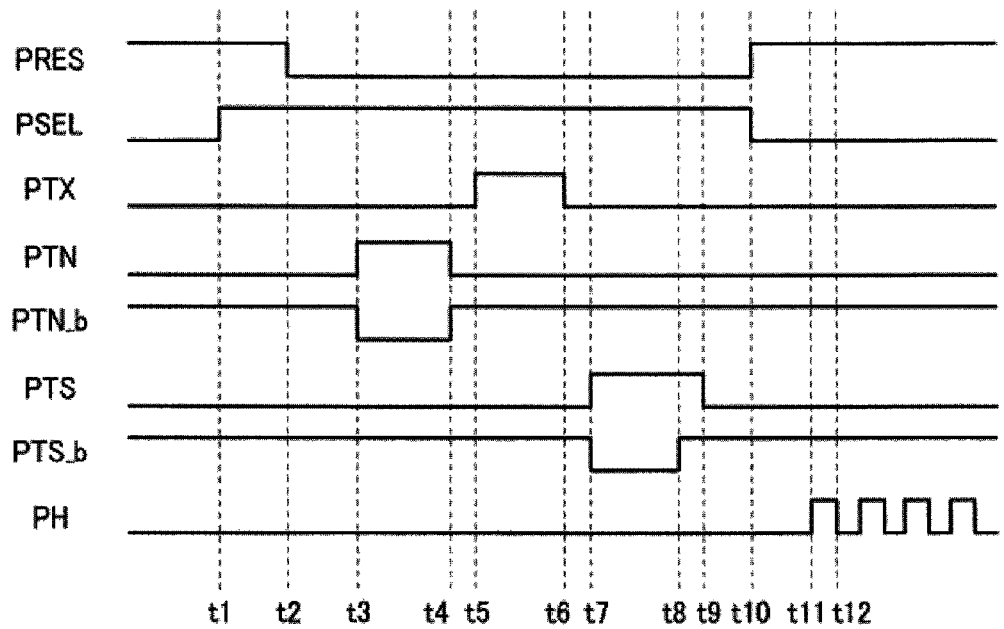
FIG. 11 is a timing diagram illustrating an operation example of the solid-state imaging apparatus of the third embodiment.

The operation of the solid-state imaging apparatus will be described with reference to FIG. 11. The selection signal PSEL inputted to the gate of the select transistor 205 rises to the high level at time t1, which turns on the select transistor 205 and activates the amplifier transistor 203. In this state, the reset signal PRES is at the high level, the reset transistor 204 is on, and the FD 217 is reset by the reset voltage SVDD. The reset signal PRES inputted to the gate of the reset transistor 204 drops to the low level at time t2, which turns off the reset transistor 204, and the electric potential of the FD 217 is fixed to the black signal level and the reference electric potential VN of the column signal line 110 is decided. The PTS pulse rises to the high level and the PTN_b pulse drops to the low level at time t3, which turn on the switches 211n and 211p of the signal holding unit 105, and writing of the reference electric potential VN of the column signal line 110 into the holding capacitor 213 starts. The PTN pulse drops to the low level and the PTN_b pulse rises to the high level at time t4, which turn off the switches 211n and 211p and the writing finishes. The transfer pulse PTX inputted to the gate of the transfer transistor 202 of the pixel 101 rises to the high level at time t5, which turns on the transfer transistor 202, and the signal electric charge of the photodiode 201 is transferred to the FD 217. The transfer pulse PTX drops to the low level at time t6, which turns off the transfer transistor 202, and the transfer finishes. Then at time t7, the PTS pulse rises to the high level and the PTS_b drops to the low level, which turn on the switches 212n and 212p of the signal holding unit 105, and the signals are written in the holding capacitor 214.

In response to the transfer pulse PTX having rose to the high level, the electric potential of the column signal line 110 changes from VN to VS. When the signal electric charge is electric, VS<VN. The optical signal voltages VS are written in the holding capacitor 214 via the switches 212n and 212p of the signal holding unit 105. The PTS_b pulse drops to the low level at time t8, which turns off the switch 212p, and then the PTS pulse rises to the high level at time t9, which turns off the switch 212n, and the writing finishes.

Then at time t10, the reset signal PRES rises to the high level, which turns on the reset transistor 204 of the pixel 101, and the FD 217 is reset. At the same time, the selection signal PSEL drops to the low level, which turns off the select transistor 205. In response to that, the row selection is deselected. Then at time t11, the PH pulse supplied from the horizontal scan circuit 108 turns on the column select switches 215 and 216, and the output amplifier 109 calculates the difference between the N output and the S output and outputs the image signal. That process ends at time t12, and thereafter, signals are outputted from the columns in order in synchronization with the PH pulse.

If the output of the pixel is saturated when the writing of signals finishes from time t8 to time t9 with the above-mentioned operation, the electric potential of the column signal line 110 decreases near to the GND level, and the electric potential is written in the holding capacitor 214. When the electric potential near the GND is written in the holding capacitor 214, a channel is not generated in the PMOS transistor 212p so that a channel capacity is not generated, which decreases the gate capacity. In contrast, a channel is generated in the NMOS transistor 212n, which increases the gate capacity. Since the drive capacity of the buffer for driving the PMOS transistor 212p decreases, the PMOS transistor 212p is turned off faster at the farther side from the buffer. In contrast, the NMOS transistor 212n is turned off faster at the farther side from the buffer.

In the embodiment, the same circuit as that of the first embodiment shown in FIG. 6 is used for the control unit 106 so that the timing pulses for turning off the PTS, PTS_b, PTN and PTN_b transistors can be inputted from outside of the solid-state imaging apparatus. Like the first embodiment, since the pulse for turning off the PTS transistor is received from outside after the PTS_b transistor is completely turned off in this embodiment, the signal electric potential of the column signal line 110 is always subject to the electric potential variation by the pulse for turning off the PTS transistor. That suppresses the occurrence of a white or black stripe at either side of the spot.

Figure 12:
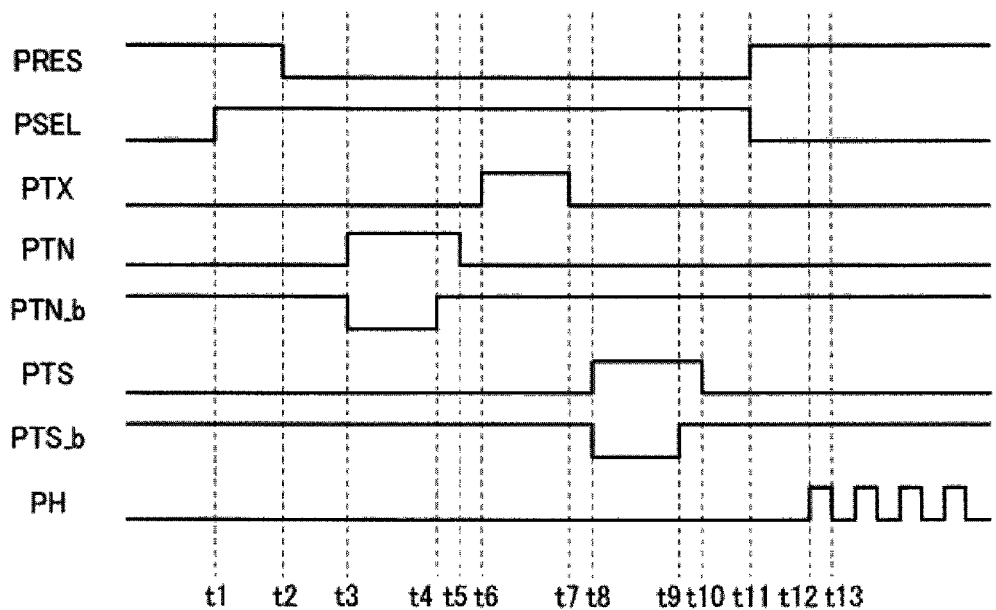
FIG. 12 is another diagram illustrating an operation example of the solid-state imaging apparatus of a third embodiment according to the present invention.

Since the embodiment also suppresses the electric potential variation of the N signal by turning off the PTN_b transistor at time t4 and turning off the PTN at time t5 as shown in FIG. 12, it can more accurately obtain the difference between the S signal and the N signal as the first and second embodiments can. Like the second embodiment, the timing can be made for PTN and PTN_b or PTS and PTS_b by using the delay circuit. If it is applied to the third embodiment, it is only needed that an input pad external to PTN and PTN_b is standardized and the delay circuit is provided for the supply line of the PIN. Also, it is only needed that an input pad external to PTS and PTS_b is standardized and the delay circuit is provided in the supply line of the PTS.

Fourth Embodiment

Figure 13:
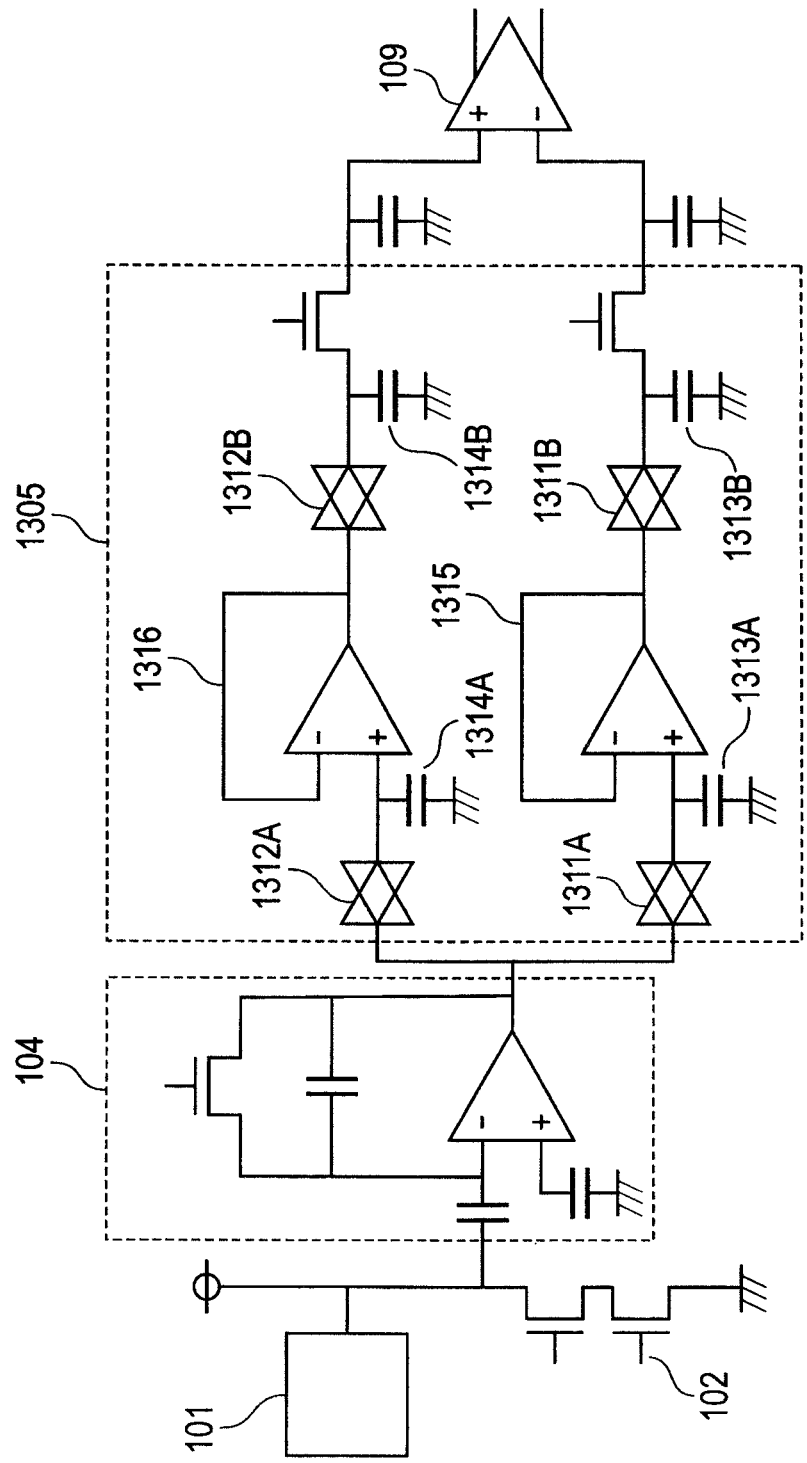
FIG. 13 is a block diagram illustrating a configuration example of a solid-state imaging apparatus of a fourth embodiment according to the present invention.

FIG. 13 is a block diagram illustrating a configuration example of a solid-state imaging apparatus of a fourth embodiment according to the present invention. The fourth embodiment is different from the first embodiment in a structure of a signal holding portion 1305. In concrete, the signal holding portion 1305 is formed to include a first CMOS switch 1311A, a second CMOS switch 1312A, a third CMOS switch 1311B and a fourth CMOS switch 1312B. Similar to the first embodiment, a path for the optical signal and a path for noise signal are separated. So long as both of the paths are the same in a fundamental structure, they are explained with reference to the path for the signal as an example.

A signal amplified by a signal amplifier unit 104 is transferred through the second CMOS switch 1312A and is held in a capacitor 1314A. Simultaneously to that, the signal is amplified by an amplifier 1316, transferred through the fourth CMOS switch 1312B and is held in a capacitor 1314B. Thereafter, similar to the first embodiment, the signals are outputted successively according to the pulse from a horizontal scanning circuit.

Also in the present embodiment, by setting NMOS transistors and PMOS transistors forming the first to fourth CMOS switches such that the NMOS transistors are turned off at a different timing from that the PMOS transistors are turned off, the same advantage as that of the first embodiment can be provided. At least, in each one of the CMOS switches, the NMOS transistor is turned off at a different timing from that the PMOS transistor is turned off. More desirably, all of the NMOS transistors are turned off at the different timing from that all of the PMOS transistors are turned off.

According to the present embodiment, since, at a state of holding the signal by the capacitors 1313B and 1314B, signal from the next row can be held by the capacitors 1313A and 1314A, an advantage of high speed signal reading out can be provided, in addition to the advantage of the first embodiment.

The above-mentioned embodiments are merely intended to indicate specific examples for implementing the present invention, therefore, the technical scope of the present invention should not be construed as limited to the embodiments. That is, the present invention can be implemented in variations without departing from its technical idea or main features. Any combination of the above-mentioned embodiments is possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-117723, filed May 21, 2010, which is hereby incorporated by reference herein in its entirety.

What is claimed is:

1. A solid-state imaging apparatus comprising:
a plurality of signal lines to each of which a signal is outputted from each of a plurality of pixels;
a plurality of first holding capacitors for holding the signal outputted from each of the plurality of signal lines;
a plurality of first CMOS switches arranged between the plurality of signal lines and the plurality of first holding capacitors, each of the plurality of first CMOS switches including a first NMOS transistor and a first PMOS transistor;
a first control line electrically connected to a gate of a plurality of the first NMOS transistors; and
a second control line electrically connected to a gate of a plurality of the first PMOS transistors, wherein
the first and second control lines supply signals of different timings, such that a timing of turning off the first NMOS transistor is shifted from a timing of turning off the first PMOS transistor.

2. The solid-state imaging apparatus according to claim 1, wherein,
in all of the plurality of first CMOS switches, the first NMOS transistors turns off before turning off the first PMOS transistors, or the first PMOS transistors turns off before turning off the first NMOS transistors.

3. The solid-state imaging apparatus according to claim 1, further comprising
a control unit for controlling the signal to be supplied to the first and second control lines, such that the timing of turning off the first NMOS transistor is shifted from the timing of turning off the first PMOS transistor.

4. The solid-state imaging apparatus according to claim 1, further comprising
a plurality of second holding capacitors for holding a reset signal for resetting the pixel outputted from each of the plurality of signal lines;
a plurality of second CMOS switches arranged between the plurality of signal lines and the plurality of second holding capacitors, each of the plurality of second CMOS switches including a second NMOS transistor and a second PMOS transistor;
a third control line electrically connected to a gate of a plurality of the second NMOS transistors; and
a fourth control line electrically connected to a gate of a plurality of the second PMOS transistors, wherein
the third and fourth control lines supply signals of different timings, such that a timing of turning off the second NMOS transistor is shifted from a timing of turning off the second PMOS transistor.

5. The solid-state imaging apparatus according to claim 1, further comprising
a plurality of amplifier units arranged between the plurality of signal lines and the plurality of first CMOS switches, each of the plurality of amplifier units amplifying the signal outputted from each of the plurality of signal lines.

6. The solid-state imaging apparatus according to claim 1, further comprising
a first electrode pad for supplying a control signal to the first control line, and
a second electrode pad for supplying a control signal to the second control line.

7. The solid-state imaging apparatus according to claim 1, further comprising
an electrode pad, and
a delay circuit for delaying a signal inputted to the electrode pad, wherein
one of the first and second control lines is connected through the delay circuit to the electrode pad, and
the other of the first and second control lines is connected not through the delay circuit to the electrode pad.

8. The solid-state imaging apparatus according to claim 1, further comprising
a first input pad for supplying a pulse to the first control line, and a second input pad for supplying a pulse to the second control line, wherein a delay quantity of the pulse from the first input pad though an electric path into a first NMOS transistor arranged closest to the first input pad among the plurality of first NMOS transistors driven by the first control line is different from a delay quantity of the pulse from the second input pad though an electric path into a first PMOS transistor arranged closest to the second input pad among the plurality of first PMOS transistors driven by the second control line.

9. A solid-state imaging apparatus comprising:
a plurality of signal lines to each of which a signal is outputted from each of a plurality of pixels;
a plurality of first holding capacitors for holding the signal outputted from each of the plurality of signal lines;
a plurality of first CMOS switches arranged between the plurality of signal lines and the plurality of first holding capacitors, each of the plurality of first CMOS switches including a first NMOS transistor and a first PMOS transistor;
a first control line electrically connected to a gate of a plurality of the first NMOS transistors; and
a second control line electrically connected to a gate of a plurality of the first PMOS transistors, wherein a first input pad for supplying a pulse to the first control line, and
a second input pad for supplying a pulse to the second control line, wherein
a delay quantity of the pulse from the first input pad though an electric path into a first NMOS transistor arranged closest to the first input pad among the plurality of first NMOS transistors driven by the first control line is different from a delay quantity of the pulse from the second input pad though an electric path into a first PMOS transistor arranged closest to the second input pad among the plurality of first PMOS transistors driven by the second control line.

10. The solid-state imaging apparatus according to claim 9, wherein,
the first input pad and the second input pad are formed by the same conductor pattern.

11. The solid-state imaging apparatus according to claim 9, wherein,
the first input pad and the second input pad are formed by the same conductor pattern;
the delay quantity of the pulse into the first PMOS transistor arranged closest to the second input pad is larger than the delay quantity of the pulse into the first NMOS transistor arranged closest to the first input pad.

* * * * *